(12) United States Patent
Tourapis et al.

(10) Patent No.: US 11,758,133 B2
(45) Date of Patent: Sep. 12, 2023

(54) FLEXIBLE BLOCK PARTITIONING STRUCTURES FOR IMAGE/VIDEO COMPRESSION AND PROCESSING

(71) Applicant: Apple Inc., Cupertino, CA (US)

(72) Inventors: Alexandros Tourapis, Milpitas, CA (US); David W. Singer, San Francisco, CA (US); Dominik Mehlem, Cupertino, CA (US); Krishnakanth Rapaka, San Jose, CA (US)

(73) Assignee: APPLE INC, Cupertino, CA (US)

( * ) Notice: Subject to any disclaimer, the term of this patent is extended or adjusted under 35 U.S.C. 154(b) by 63 days.

(21) Appl. No.: 16/834,611

(22) Filed: Mar. 30, 2020

(65) Prior Publication Data

US 2021/0136370 A1 May 6, 2021

Related U.S. Application Data

(60) Provisional application No. 62/929,045, filed on Oct. 31, 2019.

(51) Int. Cl.
*H04N 19/119* (2014.01)
*H04N 19/159* (2014.01)
*H04N 19/543* (2014.01)
*H04N 19/176* (2014.01)
*H04N 19/573* (2014.01)
*H04N 19/139* (2014.01)

(52) U.S. Cl.
CPC ......... *H04N 19/119* (2014.11); *H04N 19/139* (2014.11); *H04N 19/159* (2014.11); *H04N 19/176* (2014.11); *H04N 19/543* (2014.11); *H04N 19/573* (2014.11)

(58) Field of Classification Search
CPC .. H04N 19/119; H04N 19/139; H04N 19/159; H04N 19/176; H04N 19/543; H04N 19/573
USPC .................................................... 375/240.02
See application file for complete search history.

(56) References Cited

U.S. PATENT DOCUMENTS

| | | | |
|---|---|---|---|
| 9,392,272 B1 * | 7/2016 | Wang | H04N 19/176 |
| 2008/0175488 A1 * | 7/2008 | Yokose | H04N 1/0083 |
| | | | 382/232 |
| 2018/0084255 A1 * | 3/2018 | Tourapis | H04N 19/521 |

(Continued)

OTHER PUBLICATIONS

Zhang et al.; "Overlapped Variable Size Block Motion Compensation"; International Conference on Image Processing; vol. 3; Oct. 1997. (Year: 1997).*

(Continued)

*Primary Examiner* — Ayman A Abaza
(74) *Attorney, Agent, or Firm* — BakerHostetler

(57) ABSTRACT

Techniques for coding and decoding video may include predicting picture regions defined by a time-varying tessellation and/or by a tessellation that varies spatially within a picture. These techniques improve decoded video quality, for example, by reducing block-based visual artifacts. Tessellation patterns may be irregular spatially to prevent alignment of some prediction region boundaries within a picture. Tessellation patterns may vary over time based on a spatial offset value, and the spatial offset value may be determined via a modulo function. Tessellation patterns may include overlapped shapes, for example when used in conjunction with overlapped block motion compensation.

18 Claims, 9 Drawing Sheets

(56) References Cited

U.S. PATENT DOCUMENTS

| | | | |
|---|---|---|---|
| 2018/0109814 A1* | 4/2018 | Chuang | H04N 19/645 |
| 2019/0158863 A1* | 5/2019 | Mory | H04N 21/2402 |
| 2019/0268618 A1* | 8/2019 | Bankoski | H04N 19/167 |
| 2020/0244976 A1* | 7/2020 | Zhao | H04N 19/119 |
| 2020/0329241 A1* | 10/2020 | Park | H04N 21/235 |

OTHER PUBLICATIONS

"Series H: Audiovisual and Multimedia Systems—Infrastructure of audiovisual services—Coding of moving video"; High efficiency video coding; ITU-T; H.265; Feb. 2018; 692 pages.

Zhang et al.; "Overlapped Variable Size Block Motion Compensation"; Int'l Conf. on Image Processing; vol. 3; Oct. 1997; p. 642-645.

International Patent Application No. PCT/US2020/051462; Invitation to Pay Add'l Fees; dated Dec. 10, 2020; 15 pages.

International Patent Application No. PCT/US2020/051462; Int'l Search Report and the Written Opinion; dated Feb. 4, 2021; 19 pages.

International Patent Application No. PCT/US2020/051462; Int'l Preliminary Report on Patentability; dated May 12, 2022; 13 pages.

\* cited by examiner

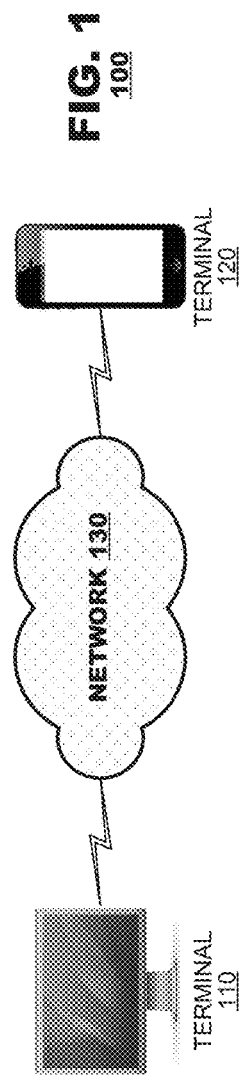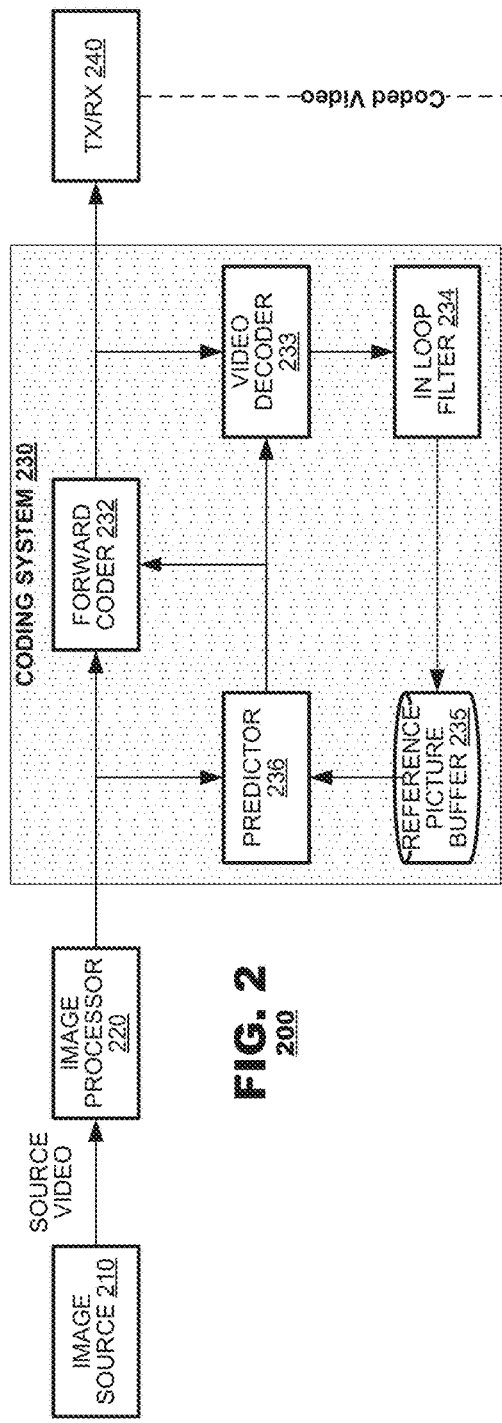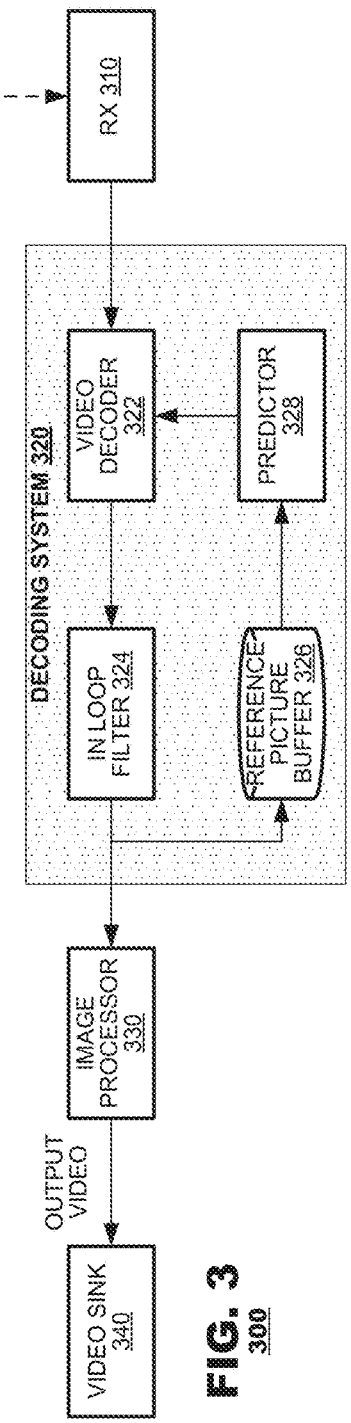

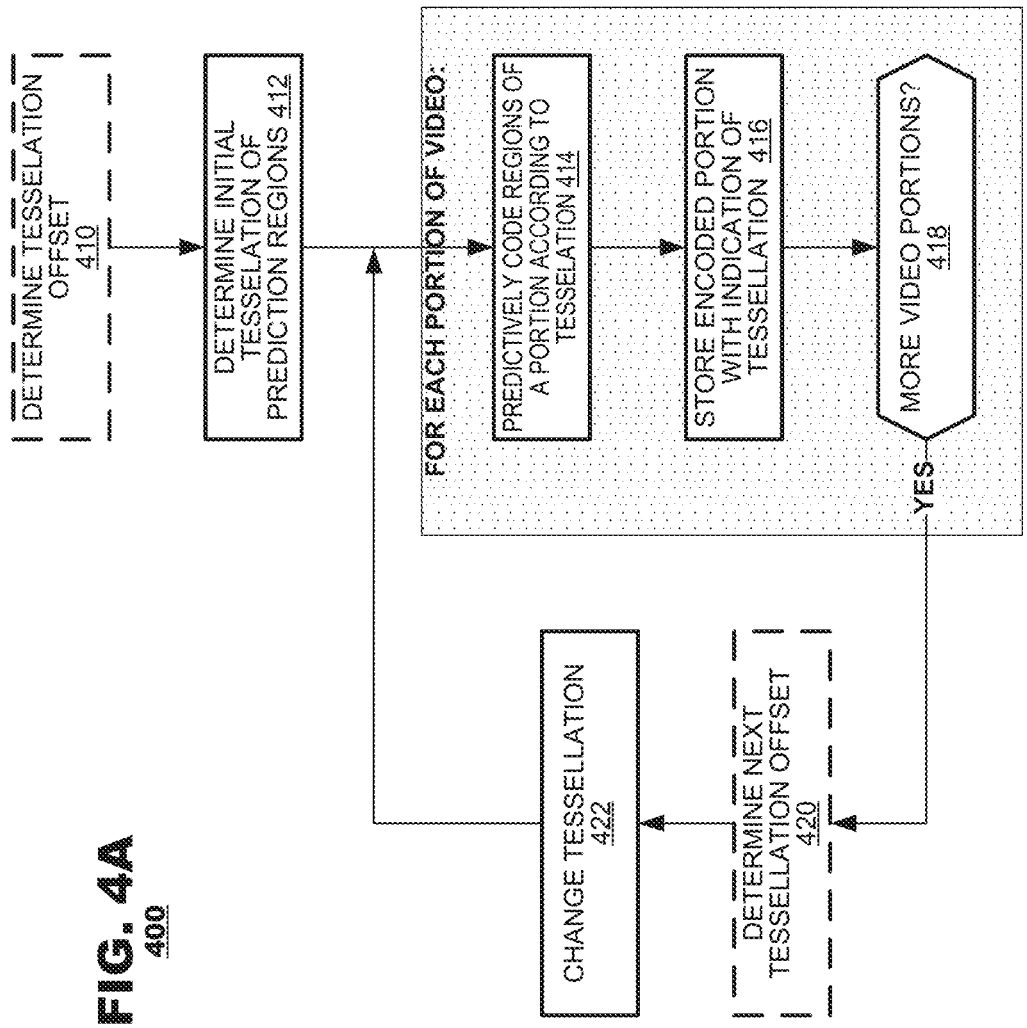

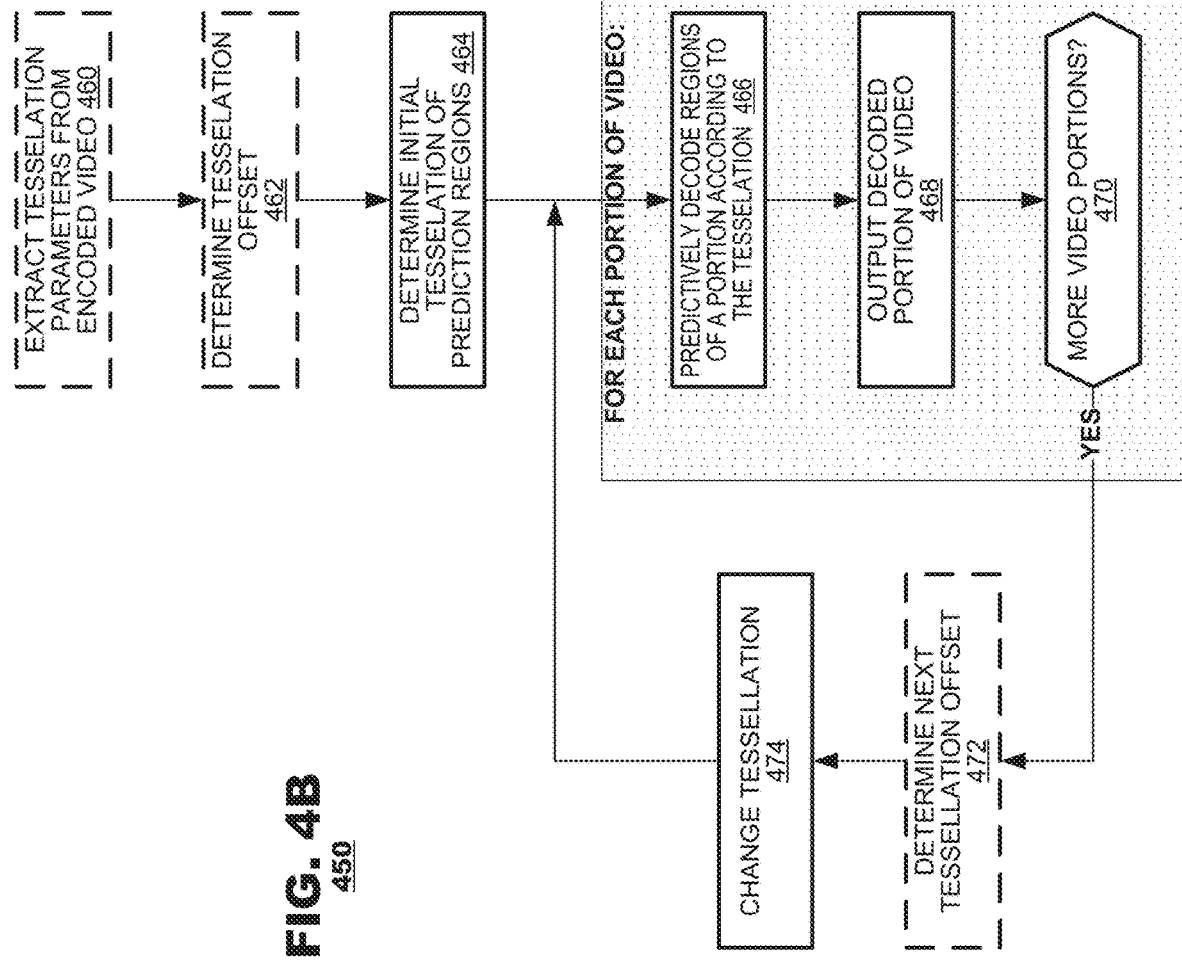

510

520

530

540

560

580

550

570

600

700

810

820

830

900

FLEXIBLE BLOCK PARTITIONING STRUCTURES FOR IMAGE/VIDEO COMPRESSION AND PROCESSING

CROSS REFERENCE TO RELATED APPLICATIONS

This application claims the benefit of priority under 35 USC 119(e) of U.S. provisional application No. 62/929,045, filed on Oct. 31, 2019.

BACKGROUND

The present disclosure relates to video coding and, more particularly, block-based predictive coding.

Traditional image and video coding schemes commonly employ prediction, computing a residual from the prediction, transform and quantization of the residual, in-loop filtering, and entropy coding to produce a compressed bitstream.

In prediction, a region of the image to be coded (e.g. a block area of size M×N) is predicted using previously coded samples (spatially and/or temporally) if available or using some "predefined" prediction methods or values. Such regions are commonly placed on a fixed grid that does not vary in time, with a large, fixed size super partition, e.g. a macroblock (MB) or coding tree unit (CTU), defining the boundaries of the grid. It is permitted commonly, however, that such super-partitions could be subdivided further into sub-partitions of smaller size and different shape than the super partition. Smaller sub-partitions may include, for example, coding units (CUs), prediction units (PUs), sub-macroblocks, transform units (TUs), etc.

Any residual remaining after prediction is commonly computed by comparing the prediction to a source video signal (possibly after prefiltering) that corresponds to each individual prediction region.

This residual, if available, can then be transformed using a specific transform, such as a discrete cosine transform (DCT), and then quantized to remove information that is commonly perceived as less important for the visualization of the image.

In-loop filtering, such as deblocking, sample adaptive offset processing, adaptive loop filtering, etc., may also be applied on such a block, as well as on its neighbors, to reduce possible coding artifacts that the coding process may have introduced.

Any information needed to construct this block, such as block partitioning, the prediction mode, and its associated information, e.g. motion vectors and reference indices, the type of the transform or transforms used, quantization parameters, as well as any remaining quantized coefficients, among others, are then entropy encoded and added into the compressed bitstream.

Decoding the compressed bitstream for a block will invert the above process, to an extent. A decoder may first entropy decode the compressed bitstream to derive the encoded information (partitions, modes, motion vectors (MVs), quantized coefficients, etc.), and entropy decoding may be followed by the prediction process. The inverse quantization and transform steps could be performed in parallel, and the reconstructed residual is then added onto the prediction information. This reconstructed block may then be in-loop filtered given the appropriate in-loop filtering mechanisms supported and used by the underlying codec.

SUMMARY

Techniques for coding and decoding video may include predicting picture regions defined by a time-varying tessellation and/or by a tessellation that varies spatially within a picture. These techniques improve decoded video quality, for example, by reducing block-based visual artifacts.

In an aspect, encoding techniques may include determining a first spatial partitioning; predictively coding a first picture of a sequence of source video pictures including predicting partitions of the first picture according to the first spatial partitioning; determining a second spatial partitioning different from the first spatial partitioning; predictively coding a second picture of the sequence of the source video pictures including predicting partitions of the second picture according to the second spatial partitioning; and transmitting a coded video sequence including the first coded picture, the second coded picture, and an indication of the first spatial partitioning and the second spatial partitioning.

In another aspect, decoding techniques may include A method of decoding video comprising: extracting, from a coded video sequence, an indication of a first spatial partitioning; predictively decoding a first picture of the coded video sequence including predicting partitions of the first picture according to the first spatial partitioning; extracting, from the coded video sequence, an indication of a second spatial partitioning different from the first spatial partitioning; predictively decoding a second picture of the coded video sequence including predicting partitions of the second picture according to the second spatial partitioning; and transmitting a coded video sequence including the first coded picture, the second coded picture, and an indication of the first spatial partitioning and the second spatial partitioning.

In another aspect, encoding techniques may include determining a tessellation for each corresponding portion of a source video, wherein the tessellations define prediction regions for the corresponding portion and wherein the tessellations vary between the portions; predictively coding the portions including predicting the prediction regions defined by a portion's corresponding tessellation; and storing coded video including the coded portions and an indication of the varying tessellations.

In another aspect, decoding techniques may include extracting, from an encoded video stream, an indication of a tessellation into prediction regions for each corresponding portion of video in the encoded video stream, wherein the tessellations vary between the portions; decoding the portions with predictive decoding techniques including predicting the prediction regions defined by a portion's corresponding tessellation; and outputting the decoded portions.

As used herein, "tessellation" may refer to overlapping or non-overlapping shapes that cover an area being tessellated, for example in conjunction with overlapped block motion compensation.

BRIEF DESCRIPTION OF THE DRAWINGS

FIG. 1 illustrates an example simplified block diagram of a video delivery system.

FIG. 2 is a functional block diagram illustrating components of an example encoding terminal.

FIG. 3 is a functional block diagram illustrating components of an example decoding terminal.

FIG. 4A is an example encoding flow diagram 400.

FIG. 4B is an example decoding flow diagram 450.

DETAILED DESCRIPTION

Figure 5A:
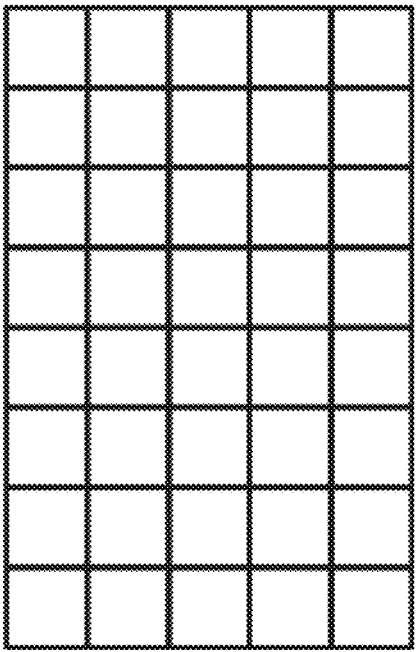
FIG. 5A depicts an example a conventional partitioning grid.

FIG. 1 illustrates a simplified block diagram of a video delivery system 100 according to an aspect of the present disclosure. The system 100 may include a plurality of terminals 110, 120 interconnected via a network. The terminals 110, 120 may code video data for transmission to their counterparts via the network. Thus, a first terminal 110 may capture video data locally, code the video data and transmit the coded video data to the counterpart terminal 120 via a channel. The receiving terminal 120 may receive the coded video data, decode it, and render it locally, for example, on a display at the terminal 120. If the terminals are engaged in bidirectional exchange of video data, then the terminal 120 may capture video data locally, code the video data and transmit the coded video data to the counterpart terminal 110 via another channel. The receiving terminal 110 may receive the coded video data transmitted from terminal 120, decode it, and render it locally, for example, on its own display. The processes described herein may operate on both frame pictures and interlaced field pictures coding but, for simplicity, the present discussion will describe the techniques in the context of integral frames.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as a personal computer and a smart phone, respectively, but the principles of the present disclosure are not so limited. Aspects of the present disclosure also find application with various types of computers (desktop, laptop, and tablet computers), computer servers, media players, dedicated video conferencing equipment, and/or dedicated video encoding equipment.

The network 130 represents any number of networks that convey coded video data between the terminals 110, 120, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

FIG. 2 is a functional block diagram illustrating components of an encoding terminal 200 according to an aspect of the present disclosure. The encoding terminal may include a video source 210, an image processor 220, a coding system 230, and a transmitter 240. The video source 210 may supply video to be coded. The video source 210 may be provided as a camera that captures image data of a local environment, a storage device that stores video from some other source or a network connection through which source video data is received. The image processor 220 may perform signal conditioning operations on the video to be coded to prepare the video data for coding. For example, the preprocessor 220 alter the frame rate, frame resolution, and/or other properties of the source video. The image processor 220 also may perform filtering operations on the source video.

The coding system 230 may perform coding operations on the video to reduce its bandwidth. Typically, the coding system 230 exploits temporal and/or spatial redundancies within the source video. For example, the coding system 230 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

intra-coding, in which an input pixel block is coded differentially with respect to previously coded/decoded data of a common frame;
  single prediction inter-coding, in which an input pixel block is coded differentially with respect to data of a previously coded/decoded frame; and
  multi-hypothesis motion compensation predictive coding, in which an input pixel block is coded predictively using decoded data from two or more sources, via temporal or spatial prediction.

The predictive coding modes may be used cooperatively with other coding techniques, such as Transform Skip coding, reduced-resolution update (RRU) coding, scaling of prediction sources, palette coding, and the like.

The coding system 230 may include a forward coder 232, a decoder 233, an in-loop filter 234, a picture buffer 235, and a predictor 236. The coder 232 may apply the differential coding techniques to the input pixel block using predicted pixel block data supplied by the predictor 236. The decoder 233 may invert the differential coding techniques applied by the coder 232 to a subset of coded frames designated as reference frames. The in-loop filter 234 may apply filtering techniques to the reconstructed reference frames generated by the decoder 233. The picture store 235 may store the reconstructed reference frames for use in prediction operations. The predictor 236 may predict data for input pixel blocks from within the reference frames stored in the picture store.

The transmitter 240 may transmit coded video data to a decoding terminal via a channel.

FIG. 3 is a functional block diagram illustrating components of a decoding terminal 300 according to an aspect of the present disclosure. The decoding terminal may include a receiver 310 to receive coded video data from the channel, a video decoding system 320 that decodes coded data, a post-processor 330, and a video sink 340 that consumes the output video data.

The receiver 310 may receive a data stream from the network and may route components of the data stream to appropriate units within the terminal 300. Although FIGS. 2 and 3 illustrate functional units for video coding and decoding, terminals 110, 120 (FIG. 1) often will include coding/decoding systems for audio data associated with the video and perhaps other processing units (not shown). Thus, the receiver 310 may parse the coded video data from other elements of the data stream and route it to the video decoder 320.

The video decoding system 320 may perform decoding operations that invert coding operations performed by the coding system 230. The video decoder may include a decoder 322, an in-loop filter 324, a picture buffer 326, and a predictor 328. The decoder 322 may invert the differential coding techniques applied by the coder 232 to the coded frames. The in-loop filter 324 may apply filtering techniques to reconstructed frame data generated by the decoder 322. For example, the in-loop filter 324 may perform various filtering operations (e.g., de-blocking, de-ringing filtering, sample adaptive offset processing, and the like). The filtered frame data may be output from the decoding system. The picture store 326 may store reconstructed reference frames for use in prediction operations. The predictor 328 may predict data for input pixel blocks from within the reference frames stored by the picture store according to prediction reference data provided in the coded video data.

The post-processor 330 may perform operations to condition the reconstructed video data for display. For example, the post-processor 330 may perform various filtering operations (e.g., de-blocking, de-ringing filtering, and the like), which may obscure visual artifacts in output video that are generated by the coding/decoding process. The post-processor 330 also may alter resolution, frame rate, color space, etc. of the reconstructed video to conform it to requirements of the video sink 340.

The video sink 340 represents various hardware and/or software components in a decoding terminal that may consume the reconstructed video. The video sink 340 typically may include one or more display devices on which reconstructed video may be rendered. Alternatively, the video sink 340 may be represented by a memory system that stores the reconstructed video for later use. The video sink 340 also may include one or more application programs that process the reconstructed video data according to controls provided in the application program. In some aspects, the video sink may represent a transmission system that transmits the reconstructed video to a display on another device, separate from the decoding terminal; for example, reconstructed video generated by a notebook computer may be transmitted to a large flat panel display for viewing.

The foregoing discussion of the encoding terminal and the decoding terminal (FIGS. 2 and 3) illustrates operations that are performed to code and decode video data in a single direction between terminals, such as from terminal 110 to terminal 120 (FIG. 1). In applications where bidirectional exchange of video is to be performed between the terminals 110, 120, each terminal 110, 120 will possess the functional units associated with an encoding terminal (FIG. 2) and each terminal 110, 120 will possess the functional units associated with a decoding terminal (FIG. 3). Indeed, in certain applications, terminals 110, 120 may exchange multiple streams of coded video in a single direction, in which case, a single terminal (say terminal 110) will have multiple instances of an encoding terminal (FIG. 2) provided therein. Such implementations are fully consistent with the present discussion.

FIG. 4A is an example encoding flow diagram 400. FIG. 4A includes determining an initial tessellation of prediction regions (box 412). Then for each portion of video to be coded, image regions defined by the tessellation are predictively coded (box 414), and the encoded video portions are stored or transmitted along with an indication of the tessellation. If there are more video portions to be coded (box 418), the tessellation may be changed (box 422), and the portion encoding process is repeated.

A tessellation (as determined in boxes 412 and 422) may be an arrangement of two-dimensional shapes closely fitted together that cover the area of a frame (or other portion of video), For example the shapes may be polygons and the arrangement may be a repeated pattern of one or more polygons without any gaps. A tessellation may define a partitioning of image data. As used herein, "tessellation" may refer to overlapping or non-overlapping shapes that cover an area being tessellated. An overlapped tessellation may be used, for example, with overlapped block motion compensation (OBMC). Tessellation may be based on a regular or uniform block structure where all blocks are the same shape and size, or may be irregular where block sizes or shapes vary within a tessellation pattern for a frame (or for another portion of video smaller than a frame). An irregular spatial pattern may allow for some block boundaries of neighboring blocks do not align. Such spatial irregularity may reduce visual blocking artifacts. Examples of a spatial tessellation pattern for partitioning of prediction regions are given below with respect to FIGS. 5A-5H. 6, and 8A-8C.

Predictive coding of a portion of video (box 414) may include, for each spatial region defined by the tessellation, predicting pixels in the region according to a selected prediction mode (such as inter or intra prediction modes). An indication of the tessellation may be stored with an encoded video portion (box 416) in a single encoded bitstream that includes the tessellation along with, for example, other prediction parameters such as motion vectors and coded residuals. Tessellation may be changed (box 422) for separate portions of video, such that the tessellation pattern may shift with time or may other otherwise vary with time. In some aspects, the changes in tessellation may be selected to reduce or minimize the number of overlapping or coincident region boundaries between portions of video. Such shifting or other tessellation pattern changes over time could reduce blocking artifacts.

In an optional aspect, a tessellation may be based on a spatial offset value, and the tessellation may vary over time by varying the offset value. In optional box 410, an initial one- or two-dimensional offset may be determined, which is then used to determine the initial tessellation in box 412. In optional box 420, a new offset may be determined and then used to determine the changed tessellation in box 422.

FIG. 4B is an example decoding flow diagram 450. FIG. 4B includes determining an initial tessellation of prediction regions (box 464). Then for each portion of video to be decoded, image regions defined by the tessellation are predicted in order to decode the video portion (box 466), and the decoded video portion is output (box 468). If there are more video portions to be decoded (box 470), the tessellation may be changed (box 474) before repeating the portion decoding process.

The tessellations determined in boxes 412 and 422 may be similar to those described above with respect to encoding in FIG. 4A. The predictive decoding of box 466 may include the counterpart of predictive encoding described above with respect to encoding in FIG. 4A.

In an optional aspect, one or more tessellation parameters may be extracted from an encoded video stream (box 469). An initial one- or two-dimensional offset may be determined (optional box 462), which may then be used to determine the initial tessellation in box 464. A new offset may be determined (optional box 420), and then used to determine the changed tessellation in box 422. Examples of tessellation parameters may be an initial offset value, a delta offset value for changing tessellation between portions, or an indication of a function used to determine changing offset values.

Non-Static Partitioning

As discussed above, traditional block-based coding systems may operate on blocks with a shape and size defined by a static grid. Unfortunately, the fact that coding regions are placed on a fixed grid can have an adverse effect on coding quality. In particular, such grids can result in compression artifacts, and more specifically blocking/blockiness artifacts that can, especially at certain quality/compression levels, become quite distracting and visible. Since such grids do not change in time, the blockiness artifacts can accumulate and worsen in time. Certain methods for mitigating such artifacts may be employed from many codecs including the use of in-loop or out-of-loop deblocking, adaptive loop filtering (ALF), and even overlapped block prediction. In the latter case, multiple blocks are allowed to overlap and the prediction for a region is performed by weighted averaging the prediction contributed from each block. This can help in reducing some of the blocking artifacts. However, such methods may also add considerable complexity to both an encoder and decoder. The other methods can also mitigate some of the artifacts, but are not always as effective since they are controlled by certain characteristics of the coding process that do not guarantee that all blocking artifacts would be identified and therefore addressed by such schemes. It should be noted that techniques described herein apply to both intra and inter prediction methods, including directional intra prediction, palette mode, intra block copy prediction, fractal prediction, translational or affine prediction, weighted prediction, warped prediction, and the like.

Figure 5B:
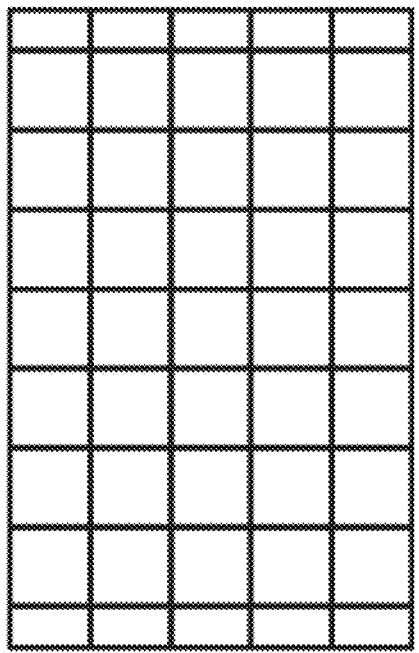
FIG. 5B depicts an example horizontally shifted partitioning grid.
Figure 5C:
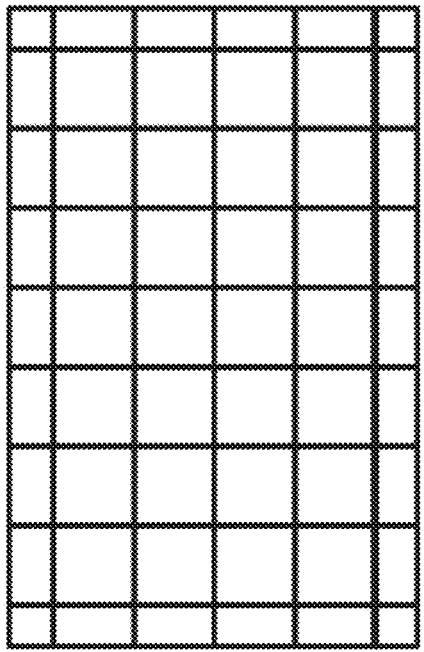
FIG. 5C depicts an example vertically and horizontally shifted partitioning grid.

Improved coding schemes may further mitigate such coding artifacts by better distributing the block partitions temporally and therefore reducing blockiness propagation. FIG. 5A depicts an example conventional partitioning grid 510 for partitioning an image frame into coding regions. Existing schemes, as mentioned earlier, use a fixed block partition scheme such as is depicted in FIG. 5A. In an aspect of this disclosure, an adaptive/non-fixed block partition scheme is used with the goal of reducing blockiness propagation around edges. In this scheme, and for every different frame, picture, slice, or tile of a picture, a different partitioning scheme is basically expected or indicated. In particular, in existing schemes commonly partitioning of an image or slice/tile is performed using square partitions of equal size, for example M×M pixels, starting from the left-top corner of the image or slice/tile that is to be encoded as shown in FIG. 5A. If the image or slice/tile is not of a resolution that is a multiple of M, then appropriate padding may be applied on the right or bottom boundary of this partition. Unlike such a traditional method, improved techniques permit the use of different sized partitions within the same region, and the different sized partitions may be arranged spatially in a manner such that the arrangement covers the entire image. Examples of such partitionings are shown in FIGS. 5B and 5C, where in the FIG. 5B the partitioning grid 520 is shifted towards the left side, while in FIG. 5C the partitioning grid 530 was shifted towards both the left and top side. The partitioning schemes of FIGS. 5B and 5C use a regular rectangular grid, however the grid includes a horizontal and/or vertical offset that controls its starting position.

A single partitioning with a single regular grid with a horizontal and/or vertical offset starting position, such as in FIGS. 5B and 5C may sufficiently reduce coding artifacts. Additional reduction in artifacts may be achieved by permitting partitioning to vary between each different frame, picture, slice, or tile of a picture. In some aspects, partitioning used for prediction may be independent of partitioning used for block-based residual coding (which may include a block-based transform and quantization). If the prediction partitioning varies enough temporally, and avoids most if not all residual coder super partition (e.g. MB or CTU level) and sub-partition (sub-macroblock, CU, PU etc.) alignments temporally, then such artifacts may be reduced. For example, super-partitions are commonly subdivided in sub-partitions in a hierarchical manner and, predominantly, using powers of two subdivision. For example, a partition of M×M usually gets subdivided in partitions of size (M/2)×M, M×(M/2), (M/2)×(M/2), (M/4)×(M/2), (M/4)×(M/4), etc. It may be advantageous to use a horizontal and/or vertical shift of prediction partitions that would result in as minimum as possible collision with the prediction partitions used in a previously coded frame. It should be noted that odd shift/offset values may not be advisable since the most commonly used image format is the 4:2:0 YUV format that specifies that the chroma/color components should be down-sampled both vertically and horizontally before coding. In such scenario, odd value offsets would result in improper/undesirable partitioning of the chroma components, i.e. at a subpixel position, which may impact the operation of the codec. Therefore, in a preferred embodiment, offsets are only allowed to be even valued.

A time varying partitioning may be determined by a spatial offset. The offset values could in one aspect be implicit, for example based on coding or time order, and not require explicit signaling. For example, for frame at display or coding order t and assuming a horizontal only offset, the offset could be computed as 2*modulo(t, N), where N is a predetermined number that is known to both the encoder and the decoder. If for both dimensions, we could compute the offsets using a different function for the horizontal offset x_offset, and vertical offset y_offset as follows:

$$x\_\text{offset}=f0(t,N)$$

$$y\_\text{offset}=f1(t,M)$$

where f0( ) and f1( ) are two functions and M and N may be some constants. f0( ) and f1( ) could be the modulo operation or some other function. Other control parameters could also be used for the functions that determine a partitioning offset.

The partitioning offset functions and the control parameters, e.g. M and N, could be fixed or could be signaled in the bitstream. In one aspect, signaling might be sufficient in the sequence parameter sets (SPS) of a stream, i.e. be constant for the entire stream. Alternatively, they could also vary per frame. In such case the offsets may not be guaranteed to be changing from one frame to the next, but that may still be desirable in some applications. However, in another aspect, partitioning offsets could be signaled directly per frame, per slice, or per tile of a picture, without a decoder needing an offset function to determine the offset. Such explicit signaling may be more efficient for both compression efficiency and decoder computation. In such cases, an encoder can decide intelligently what offset to use for each frame (or slice or tile), depending on the coding target quality, the characteristics of the regions in the image, complexity and other factors. For example, if the image is quite static and the coding quality is quite high, it may be preferable to not change the partitioning scheme from one frame to another since it is less likely that there will be much blockiness in the scene.

In another aspect, partitioning may be based on image content analysis. For example, prediction partitioning may be aligned based on the presence and characteristics of edges in the content, the characteristics of the texture, and other important features within the image that is being coded, including motion, color, and object shape among others. Keeping the partitioning consistent in that case would make the encoder operation easier since information from previous coded frames could be reused. However, if image or coding quality degrades, adjusting from one frame to the next the offsets used might be preferable.

Spatially Non-Uniform Partitioning

Figure 5D:
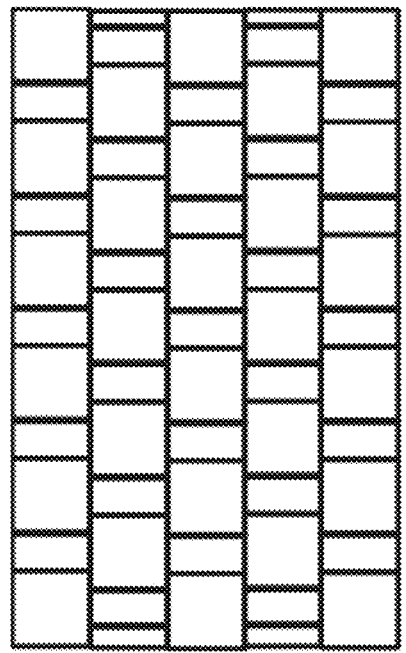
FIG. 5D depicts an example partitioning grid with variable-sized partitions.

The partitioning examples of FIGS. 5B and 5C discussed above include of a regular but moving rectangular grid, where all rectangles in the grid have a uniform shape and size (after padding partition regions at the edges of an image). In another aspect, partitioning may not be regular, and may not be based on a uniform block size and shape. For example, in a particular scenario, all CTUs that are on even vertical index positions could be of size M×M, while all odd vertical index positions could be of size N×N in one frame. In another frame the inverse order could be used. In another case, partitions within the same row could be of different size or shape, while the arrangement could vary from one row to the next and from one frame, slice, or tile of a picture to another. Such an example partitioning 540 is depicted in FIG. 5D.

Figure 5F:
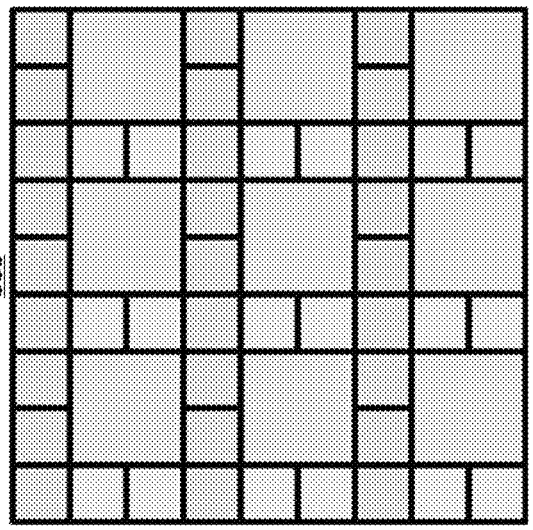
FIG. 5F depicts an example partitioning grid.
Figure 5H:
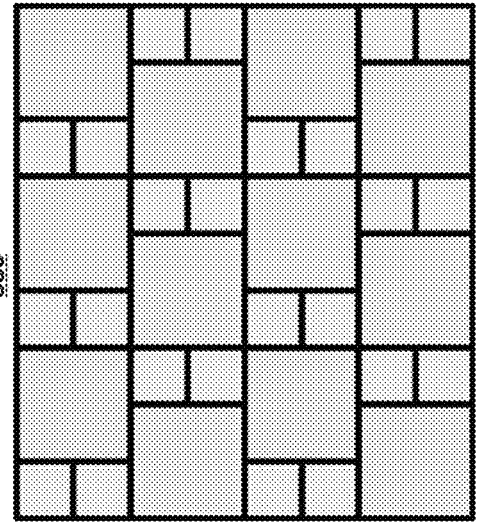
FIG. 5H depicts an example partitioning grid.
Figure 5E:
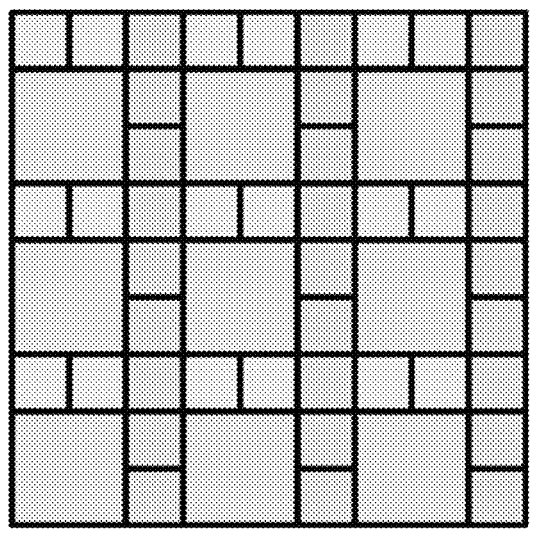
FIG. 5E depicts an example partitioning grid.

FIGS. 5E and 5F depict example partitioning grids 550 and 560, respectively. These figures depict a partitioning scheme which combines two super-partitions of size M×M and (M/2)×(M/2). Such partitioning reduces some of the partition edges and may be friendly for hardware implementations. Partitioning grids 550 and 560 include square partition region shapes with a mixture of partition region sizes. Grid 550 of FIG. 5E includes mixed partitioning of M×M and (M/2)×(M/2) super-partitions with an M×M start offset. Grid 560 of FIG. 5F includes mixed partitioning of M×M and (M/2)×(M/2) super-partitions with an (M/2)×(M/2) start offset.

Figure 5G:
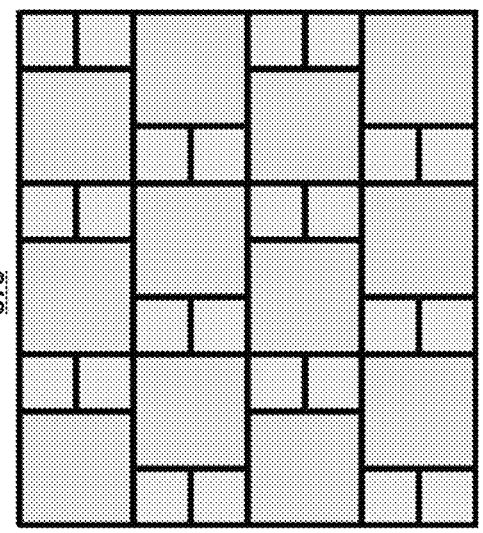
FIG. 5G depicts an example partitioning grid.

FIGS. 5G and 5H depict example partitioning grids 570 and 580 and are variations of FIGS. 5E and 5F. FIG. 5G depicts a mixed partitioning of M×M and (M/2)×(M/2) super-partitions. FIG. 5H depicts a mixed partitioning of M×M and (M/2)×(M/2) super-partitions but with a different ordering than the one in FIG. 5G.

In an aspect, spatial non-uniform partitionings such as those of FIGS. 5D-5H may be used in conjunction with a time varying spatial offset, for example as described above with respect to FIGS. 5B and 5C.

In other aspects, "block-based" partitioning needs not be limited to rectangular partition regions. Diamond, triangle, trapezoid, or other polygonal partitions could also be used in codecs that support such partition types. If such partitioning modes are utilized, according to this invention, it would be desirable to vary the partitioning mode from one frame to the next so as to avoid accumulating errors at the edges of each partition.

Figure 6:
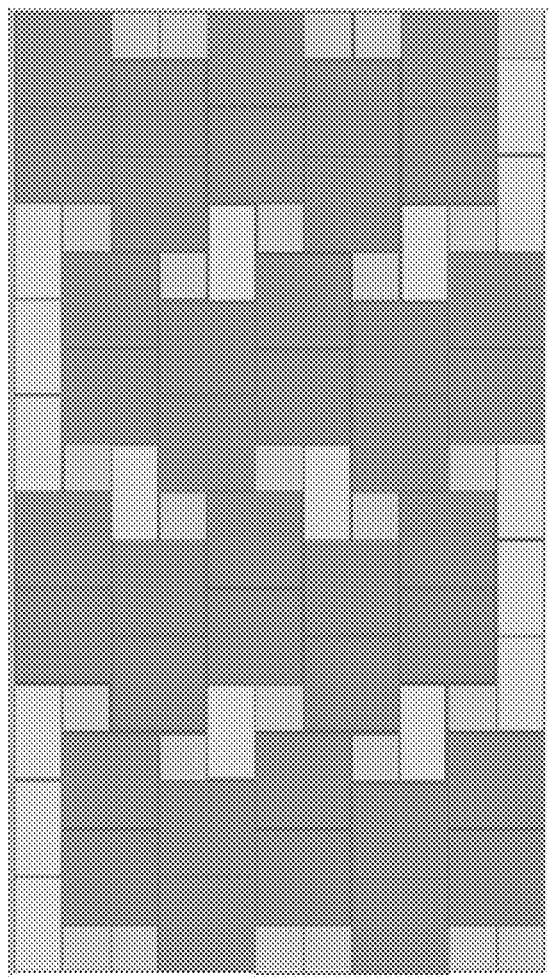
FIG. 6 depicts an example partitioning grid.

FIG. 6 depicts an example partitioning grid 600. Partitioning grid 600 includes spatial varying in both shape (squares and non-square rectangles) as well as size of partition regions. The partition regions may be equivalent to the CTU concept in HEVC/VVC, and may be further split to sub-partitions. In this aspect, the largest partition is limited. Note also that it is still possible for a large partition to be "split" in a way that still creates a single long line (e.g. the large square (green) partitions could be split into two vertical partitions right in the middle), but such splitting may be decided at an encoder and hopefully an encoder would avoid (or be biased against) using such partitioning during mode decision.

In an aspect, a spatial partitioning grid where partition boundaries are discontinuous across an image (or across a slice or other portion of video) may reduce human perceived visual blocking artifacts. For example, the structure of discontinuous blocking artifacts may have less visual structure, and hence may be less likely to be perceived. In the example of FIG. 6, the vertical partition boundaries on the right and left sides of every (green) large square partition does not meet the vertical partition boundaries of vertically neighboring large square partitions. In this way, the vertical partition boundaries of neighboring large square partitions are discontinuous.

Figure 7:
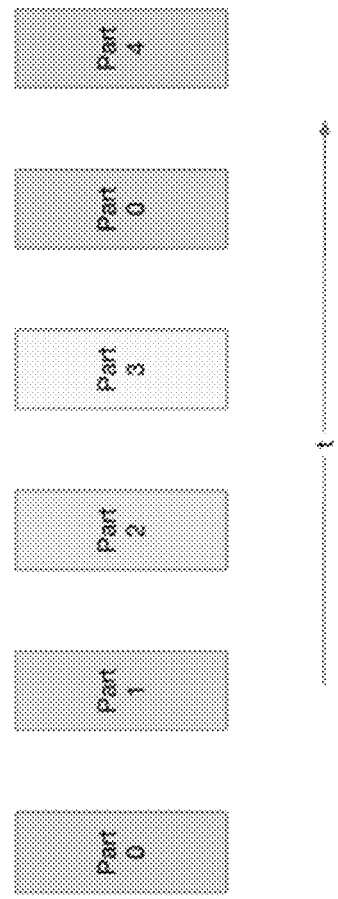
FIG. 7 depicts a timeline of partitioning variation over time.

FIG. 7 depicts a timeline 700 of partitioning variation over time. For example, time may be measured in frames in coding or presentation order. Alternatively, time in FIG. 7 may be a sequence of slices or other portions of a video sequence.

In an aspect, a fixed set of known partitionings may alternated amongst over time (or alternated over slices or other portions of a video stream). For example, a modulo function based on a input frame order number may determine which of the fixed set of know partitioning. As depicted in FIG. 7 and assuming the partitioning varies per frame, the modulo function for the first frame may determine that known partitioning 0 is used, and then for the following five frames the known partitionings are used in the order 1, 2, 3, 0, 4. A set of such predetermined known partitionings may be arbitrarily determined. Or, the predetermined known partitionings may be related to each other, for example they may all be derived from one spatial partitioning from with varying spatial offsets.

Overlapped Block Motion Compensation

Figure 8A:
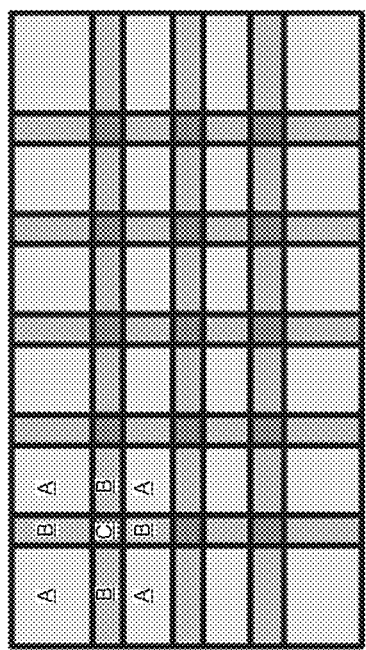
FIG. 8A depicts an example partitioning grid for use with overlapped block motion compensation (OBMC).
Figure 8B:
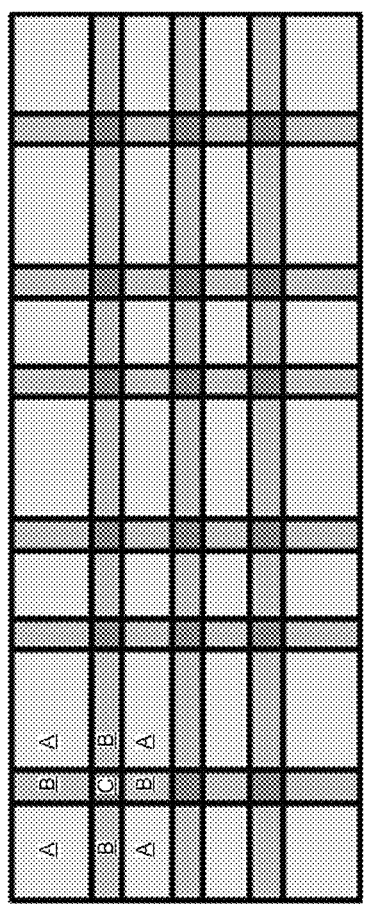
FIG. 8B depicts an example partitioning grid for use with OBMC.
Figure 8C:
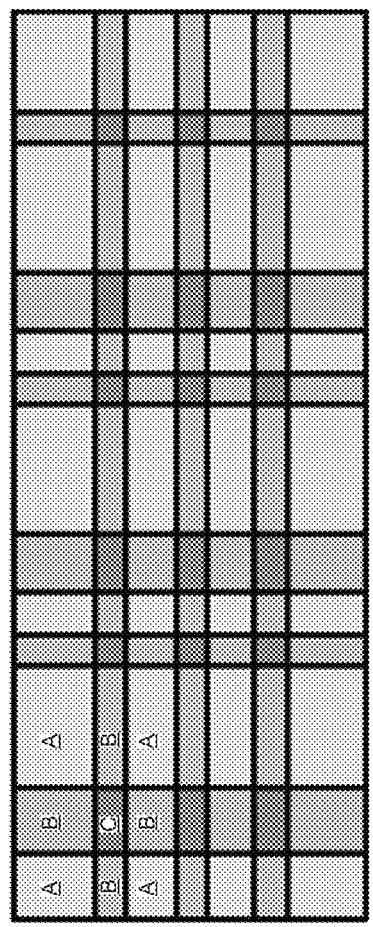
FIG. 8C depicts an example partitioning grid for use with OBMC.

FIGS. 8A, 8B, and 8C depict example partitioning grids 810, 820, and 830, respectively, for use with overlapped block motion compensation (OBMC). The various partitioning schemes described above may be generalized by combining those schemes with concepts such as OBMC. In this aspect, the partition regions may overlap (FIG. 8A). Where prediction partitions overlap, each predicted pixel may be determined as a weighted combination of the corresponding pixels predicted by each neighboring prediction region. For example, regions A in FIGS. 8A, 8B, 8C may correspond to regions that may be predicted from a single reference, while regions B may be predicted from a weighted combination of the references used in the two neighboring regions A, and regions C may be predicted may be predicted from a weighted combination of the references used in the four neighboring regions A. In one aspect, only the size of the prediction partition may be adjusted while maintaining the size of the overlap to be the constant (FIG. 8B). Grid 820 includes OBMC with different CTU sizes at even and odd horizontal positions. In another aspect, the amount of overlap between neighboring partition regions may also be changing from one partition region to the next (FIG. 8C). In grid 830, OBMC with partitions that utilize different sized weighted regions (horizontal variation only) is shown.

Partitioning may be signaled in a compressed bitstream. Again, signaling could exist in the bitstream on how such partitions could be arranged. Such signaling could exist in a variety of levels of the bitstream, e.g. in the sequence parameter sets (SPS), picture parameter sets (PPS), slice or tile headers etc. depending on the control one may wish on the partitioning or the resulting overhead (SPS and PPS information are signaled less frequently and are shared across multiple pictures; slice and/or tile headers are commonly signaled for every slice or tile in the stream).

In other aspects, various coding operations may be adjusted based on the various partition schemes described herein. For example, deblocking and adaptive loop filtering may be adjusted based on the partitioning scheme used for each different frame (or other portion of video). This may be beneficial for coding operations with the effect of reducing blockiness that results from a partitioning. In these aspects, the type or position of these operations (such as deblocking) may be determined in part based on the partitioning.

Any complexity incurred by handling of different sized partitions may be mitigated by restricting the sizes. Prediction and transform blocks could be restricted to certain sizes that might be supported by a system, e.g. 4×4, 8×8, 16×16, 32×32, 64×64 etc. Phantom partition regions created by padding non-supported partition sizes up to a supported size may reduce complexity. For example, more flexible partitioning could be handled by allowing the boundary (first and last partition on each row and column of an image, slice, or tile) to take more flexible sizes. Those could be coded explicitly by a coder that supports the size of that partition, or, alternatively those partitions could be handled by padding non-supported sizes to the nearest supported size such as a coded tree unit size. For example, if an offset of 10 was used horizontally, and assuming a CTU size of 64, then instead of having to handle a block partition of 10×64 at the left side of the image, the partition could be padded to a resolution of 16×64 or 64×64 by adding samples on the left side of this partition, and then encoded using conventional prediction and transform methods. During decoding the block would be first decoded at the padded resolution, i.e. 16×64 or 64×64, and then trimmed to the desired size by throwing away the padded samples on the left. A similar approach could be done on non CTU sized partitions on the right, top, or bottom sides of the image, slice, or tile group.

In an aspect, block-based methods are also utilized for video processing such as deinterlacing and motion compensated denoising (e.g. motion compensated temporal filtering/MCTF). The partitioning methods discussed herein could also be applied in the context of such operations since also those block-based methods could result in blocking artifacts if the operation grid remains fixed. Adjusting the operation grid per region or frame on which such operations are performed may help in reducing blocking artifacts similar to what is described herein for image/video compression systems.

Encoding with Tessellation

Figure 9:
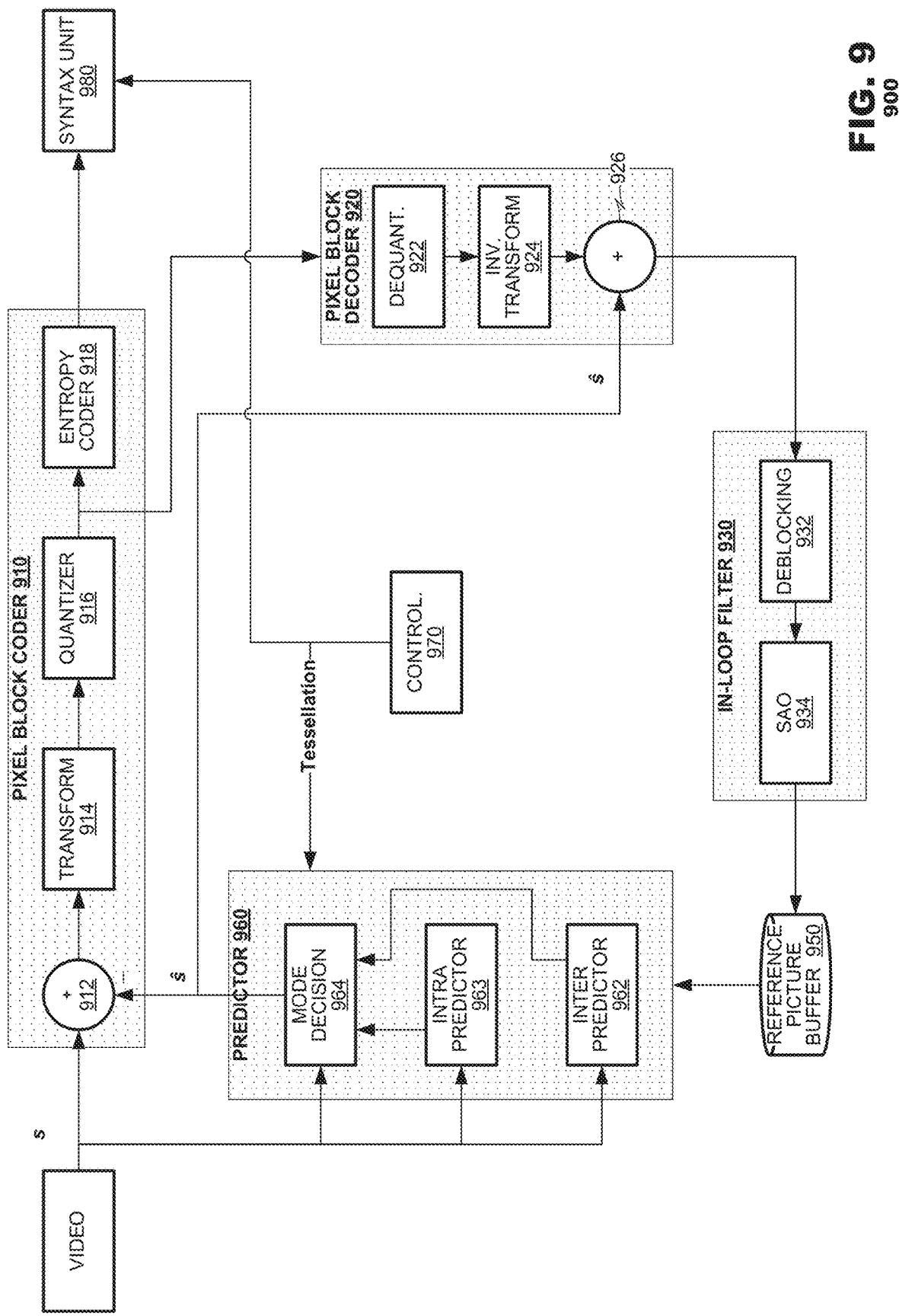
FIG. 9 is an example functional block diagram of an example coding system 900.

FIG. 9 is a functional block diagram of a coding system 900 according to an aspect of the present disclosure. The system 900 may include a pixel block coder 910, a pixel block decoder 920, a picture store 930, an in-loop filter system 930, a reference frame store 950, a predictor 960, a controller 970, and a syntax unit 980. The predictor 960 may generate a prediction block s for use by pixel block coder 910 and pixel block decoder 920. Prediction block s may be a prediction of a newly-presented block s of input source video, and prediction block s may be based on previously decoded image data stored in reference frame store 950. The pixel block coder 910 may code the new pixel block by predictive coding techniques and present coded pixel block data to the syntax unit 980. The pixel block decoder 920 may decode the coded pixel block data, generating decoded pixel block data therefrom. The in-loop filter 940 may perform one or more filtering operations on the reconstructed frame. For example, the in-loop filter 940 may perform deblocking filtering, sample adaptive offset (SAO) filtering, adaptive loop filtering (ALF), maximum likelihood (ML) based filtering schemes, 17 eranging, debanding, sharpening, resolution scaling, and the like. The reference frame store 950 may store the filtered frame, where it may be used as a source of prediction of later-received pixel blocks. The syntax unit 980 may assemble a data stream from the coded pixel block data, which conforms to a governing coding protocol.

The pixel block coder 910 may include a subtractor 912, a transform unit 914, a quantizer 916, and an entropy coder 918. The pixel block coder 910 may accept pixel blocks s of input data at the subtractor 912. The subtractor 912 may receive predicted pixel blocks s from the predictor 960 and generate an array of pixel residuals therefrom representing a difference between the input pixel block s and the predicted pixel block s. The transform unit 914 may apply a transform to the sample data output from the subtractor 912, to convert data from the pixel domain to a domain of transform coefficients. The quantizer 916 may perform quantization of transform coefficients output by the transform unit 914. The quantizer 916 may be a uniform or a non-uniform quantizer. The entropy coder 918 may reduce bandwidth of the output of the coefficient quantizer by losslessly coding the output, for example, by variable length code words or using a context adaptive binary arithmetic coder.

The transform unit 914 may operate in a variety of transform modes as determined by the controller 970. For example, the transform unit 914 may apply a discrete cosine transform (DCT), a discrete sine transform (DST), a Walsh-Hadamard transform, a Haar transform, a Daubechies wavelet transform, or the like. In an aspect, the controller 970 may select a coding mode M to be applied by the transform unit 915, may configure the transform unit 915 accordingly and may signal the coding mode M in the coded video data, either expressly or impliedly.

The quantizer 916 may operate according to a quantization parameter QP supplied by the controller 970. In an aspect, the quantization parameter QP may be applied to the transform coefficients as a multi-value quantization parameter, which may vary, for example, across different coefficient locations within a transform-domain pixel block. Thus, the quantization parameter QP may be provided as a quantization parameters array.

The entropy coder 918, as its name implies, may perform entropy coding of data output from the quantizer 916. For example, the entropy coder 918 may perform run length coding, Huffman coding, Golomb coding, Context Adaptive Binary Arithmetic Coding, and the like. Entropy coder 918 may also entropy code various encoding parameter, such as quantization parameters QP or an indication of frame tessellation for prediction.

The pixel block decoder 920 may invert coding operations of the pixel block coder 910, and may operate on blocks of the same shape and size as pixel block coder 910. For example, the pixel block decoder 920 may include a dequantizer 922, an inverse transform unit 924, and an adder 926. The pixel block decoder 920 may take its input data from an output of the quantizer 916. Although permissible, the pixel block decoder 920 need not perform entropy decoding of entropy-coded data since entropy coding is a lossless event. The dequantizer 922 may invert operations of the quantizer 916 of the pixel block coder 910. The dequantizer 922 may perform uniform or non-uniform de-quantization. Similarly, the inverse transform unit 924 may invert operations of the transform unit 914. The dequantizer 922 and the inverse transform unit 924 may use the same quantization parameters QP and transform mode M as their counterparts in the pixel block coder 910. Quantization operations likely will truncate data in various respects and, therefore, data recovered by the dequantizer 922 likely will possess coding errors when compared to the data presented to the quantizer 916 in the pixel block coder 910.

The adder 926 may invert operations performed by the subtractor 912. It may receive the same prediction pixel block s from the predictor 960 that the subtractor 912 used in generating residual signals. The adder 926 may add the prediction pixel block to reconstructed residual values output by the inverse transform unit 924 and may output reconstructed pixel block data.

The in-loop filter 930 may perform various filtering operations on recovered pixel block data. For example, the in-loop filter 940 may include a deblocking filter 932 and a sample adaptive offset (SAO) filter 934, and/or other types of in-loop filters (not shown).

The reference frame store 950 may store filtered frame data for use in later prediction of other pixel blocks. Different types of prediction data are made available to the predictor 960 for different prediction modes. For example, for an input pixel block, intra predictor 963 takes a prediction reference from decoded data of the same frame in which the input pixel block is located. Thus, the reference frame store 950 may store decoded pixel block data of each frame as it is coded. For the same input pixel block, inter predictor 962 may take a prediction reference from previously coded and decoded frame(s) that are designated as reference frames. Thus, the reference frame store 950 may store these decoded reference frames.

In an aspect, predictor 960 may operate on different types of blocks than block coder 910 and block coder 920. A predicted picture store (not depicted) may collect multiple prediction blocks output by predictor 960 for use by pixel block coder 910 and decoder 920. This may enable coder 910 and decoder 920 to operate on blocks of a different shape, size, or offset within a frame than is predicted by predictor 960. In an aspect, predictor 660 may predict blocks of pixel data where the block shapes determined by a tessellation of a video frame. The predicted block shape may vary within a frame according to the tessellation, and the tessellation may vary over time between frames. Again, prediction block shapes need not be rectangular blocks and may include any block shape used to tesselate a two-dimensional image. For example, prediction block shapes may include hexagons, octagons, triangles, and L-shaped blocks in addition to square and non-square rectangular blocks.

In another aspect, in-loop filter 930 may operate of multiple pixel blocks at a time. A decoded picture store (not depicted) may collect multiple decoded pixel blocks output from pixel block decoder 920 for use by in-loop filter 930. This may enable, for example, in-loop filter 930 to filter across pixel block boundaries The controller 970 may control overall operation of the coding system 900. The controller 970 may select operational parameters for the pixel block coder 910 and the predictor 960 based on analyses of input pixel blocks and also external constraints, such as coding bitrate targets and other operational parameters. As is relevant to the present discussion, when it selects quantization parameters QP, the use of uniform or non-uniform quantizers, the transform mode M, and/or a frame tessellation for prediction, it may provide those parameters to the entropy coder 918 or the syntax unit 980, which may include data representing those parameters in the data stream of coded video data output by the system 900. The controller 970 also may select between different modes of operation by which the system may generate reference images and may include metadata identifying the modes selected for each portion of coded data. Additionally, the controller 970 may control operation of the in-loop filter 930 and the prediction unit 960. Such control may include, for the prediction unit 960, frame tessellation, mode selection (lambda, modes to be tested, search windows, distortion strategies, etc.), and, for the in-loop filter 940, selection of filter parameters, reordering parameters, weighted prediction, etc.

During operation, the controller 970 may revise operational parameters such as QP, M, and frame tessellation for prediction at different granularities of image data, either on a per pixel block basis or on a larger granularity (for example, per frame, per slice, per largest coding unit ("LCU") or Coding Tree Unit (CTU), or another region). In an aspect, the quantization parameters may be revised on a per-pixel basis within a coded frame. Similarly, a compressed bitstream output by syntax unit 980 may include indications of operational parameters at different levels in a syntax hierarchy such as syntax levels corresponding to a pixel block, frame, slice, LUC, CTU or other portion of the compressed bitstream.

Decoding with Tessellation

Figure 10:
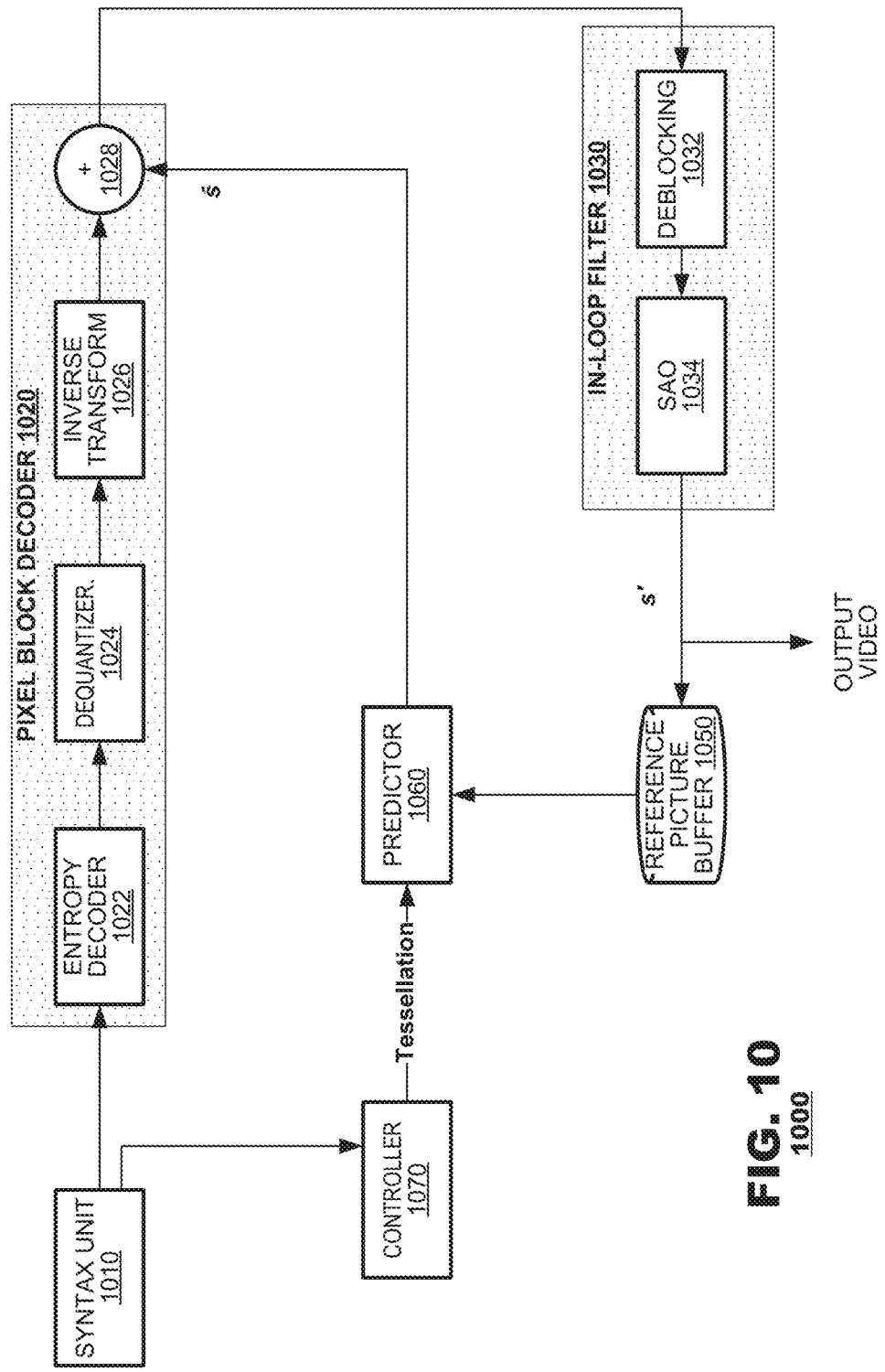
FIG. 10 is an example functional block diagram of an example decoding system 1000.

FIG. 10 is a functional block diagram of a decoding system 1000 according to an aspect of the present disclosure. The decoding system 1000 may include a syntax unit 1010, a pixel block decoder 1020, an in-loop filter 1030, a reference frame store 1050, a predictor 1060, and a controller 1070. As with the encoder (FIG. 9), a frame store (not depicted) between the predictor 1060 and the pixel block decoder 1020 may allow for different block shape, size or offset between prediction and coding.

The syntax unit 1010 may receive a coded video data stream and may parse the coded data into its constituent parts. Data representing coding parameters may be furnished to the controller 1070, while data representing coded residuals (the data output by the pixel block coder 910 of FIG. 9) may be furnished to its respective pixel block decoder 1020. The predictor 1060 may generate a prediction block s from reference data available in the reference frame store 1050 according to coding parameter data provided in the coded video data. It may supply the prediction block s to the pixel block decoder. The pixel block decoder 1020 may invert coding operations applied by the pixel block coder 910 (FIG. 9). The in-loop filter 1040 may filter the reconstructed frame data. The filtered image data may be a reconstructed approximation of source video data s' and may be output from the decoding system 1000 as output video. Filtered frames that are designated to serve as reference frames also may be stored in the reference frame store 1050 for later use by predictor 1060.

The pixel block decoder 1020 may include an entropy decoder 1022, a dequantizer 1024, an inverse transform unit 1026, and an adder 1028. The entropy decoder 1022 may perform entropy decoding to invert processes performed by the entropy coder 918 (FIG. 9). The dequantizer 1024 may invert operations of the quantizer 1016 of the pixel block coder 910 (FIG. 9). Similarly, the inverse transform unit 1026 may invert operations of the transform unit 914 (FIG. 9). They may use the quantization parameters QP and transform modes M that are provided in the coded video data stream. Because quantization is likely to truncate data, the pixel blocks s' recovered by the dequantizer 1024, likely will possess coding errors when compared to the input pixel blocks s presented to the pixel block coder 910 of the encoder (FIG. 9).

The adder 1028 may invert operations performed by the subtractor 910 (FIG. 9). It may receive a prediction pixel block from the predictor 1060 as determined by prediction references in the coded video data stream. The adder 1028 may add the prediction pixel block to reconstructed residual values output by the inverse transform unit 1026 and may output reconstructed pixel block data.

The in-loop filter 1040 may perform various filtering operations on recovered pixel block data as identified by the coded video data. For example, the in-loop filter 1040 may include a deblocking filter 1032, a sample adaptive offset (SAO) filter 1034, and/or other types of in-loop filters. In this manner, operation of the in-loop filter 1030 mimics operation of the counterpart in-loop filter 930 of the encoder 900 (FIG. 9).

The reference frame store 1050 may store filtered frame data for use in later prediction of other pixel blocks. The reference frame store 1050 may store whole decoded reference frames, and it may store a partially decoded frame as it is decoded for use in intra prediction.

In an aspect, as with the encoder, predictor 1060 may operate on different types of blocks than the block types used by block decoder 1020. A predicted picture store (not depicted) may collect multiple prediction blocks output by predictor 1060 for use by pixel block decoder 1020. This may enable block decoder 1020 to operate on blocks of a different shape, size, or offset within a frame than is predicted by predictor 1060. In an aspect, predictor 1060 may predict blocks of pixel data where the block shapes of the predicted blocks are determined by a tessellation of a video frame. The predicted block shape may vary within a frame according to the tessellation, and the tessellation may vary over time between frames. Again, prediction block shapes need not be rectangular blocks and may include any block shape used to tesselate a two-dimensional image. For example, prediction block shapes may include hexagons, octagons, triangles, and L-shaped blocks in addition to square and non-square rectangular blocks.

In another aspect, in-loop filter 1030 may operate on multiple pixel blocks at a time. A decoded picture store (not depicted) may collect multiple decoded pixel blocks output from pixel block decoder 1020 for use by in-loop filter 1030. This may enable, for example, in-loop filter 930 to filter across pixel block boundaries The controller 1070 may control overall operation of the coding system 1000. The controller 1070 may set operational parameters for the pixel block decoder 1020 and the predictor 1060 based on parameters received in the coded video data stream. As is relevant to the present discussion, these operational parameters may include tessellation parameters for prediction 1060, quantization parameters QP for the dequantizer 1024 and transform modes M for the inverse transform unit 1010. As discussed, the received parameters may vary at various granularities of image data and be communicated at various level of compressed bitstream syntax, for example, on a per pixel block basis, a per frame basis, a per slice basis, a per LCU/CTU basis, or based on other types of portions of the video.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in physical storage media such as electronic, magnetic, and/or optically-based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method of coding video comprising:
   determining a predetermined plurality of spatial partitioning schemes based on spatial offsets derived from temporal locations of corresponding input frames;
   for each of a plurality of input frames of a video to be coded, selecting a spatial partitioning scheme from the predetermined plurality of spatial partitioning schemes, wherein partitions of the spatial partitioning schemes are spatially offset from partitions of others of the spatial partitioning schemes and the selecting is based on respective temporal locations of the input frames within the video,
   for a first input frame:
      partitioning the first input frame into partitioning units according to the spatial partitioning scheme selected for the first input frame;
      coding the partitioning units of the first input frame according to a prediction algorithm;
   for a second input frame temporally offset from the first input frame:
      partitioning the second input frame into partitioning units according to the spatial partitioning scheme selected for the second input frame, and coding the partitioning units of the second input frame according to a prediction algorithm; and transmitting a coded video sequence including the first predictively-coded input frame, the second predictively-coded input frame, and indications of the spatial partitioning schemes selected for them including an indication of the corresponding spatial offsets.

2. The method of claim 1, wherein
the spatial partitioning scheme selected for the first input frame is spatial offset from an initial spatial partitioning scheme based on a temporal location of the first input frame, and
the spatial partitioning scheme selected for the second input frame is spatial offset from the initial spatial partitioning scheme based on a temporal location of the second input frame.

3. The method of claim 1, wherein the spatial offsets are predetermined based on a selected offset function of time.

4. The method of claim 1, wherein the indication of the spatial offsets includes an indication of a selected offset function of time.

5. The method of claim 1, wherein the method further comprises:
prior to coding the first or second input frames, determining the predetermined plurality of spatial partitioning schemes by deriving the spatial offsets from the function 2*modulo(t,N), where t is a respective temporal locations of an input frame, and N is a predetermined constant.

6. The method of claim 1, wherein the spatial offsets include a horizontal offset magnitude specified by a first selected function based on a first constant and a vertical offset magnitude specified by a second function based on a second constant.

7. The method of claim 1, wherein the plurality of spatial partitioning schemes includes irregular partitioning having partitions of varying shapes within a partitioning scheme for an input frame.

8. A non-transitory computer readable medium containing instructions for coding video that, when executed by a processor, cause:
determining a predetermined plurality of spatial partitioning schemes based on spatial offsets derived from temporal locations of corresponding input frames;
for each of a plurality of input frames of a video to be coded, selecting a spatial partitioning scheme from the predetermined plurality of spatial partitioning schemes, wherein partitions of the spatial partitioning schemes are spatially offset from partitions of others of the spatial partitioning schemes and the selecting is based on respective temporal locations of the input frames within the video,
for a first input frame:
partitioning the first input frame into partitioning units according to the spatial partitioning scheme selected for the first input frame;
coding the partitioning units of the first input frame according to a prediction algorithm;
for a second input frame temporally offset from the first input frame:
partitioning the second input frame into partitioning units according to the spatial partitioning scheme selected for the second input frame, and
coding the partitioning units of the second input frame according to a prediction algorithm; and
transmitting a coded video sequence including the first predictively-coded input frame, the second predictively-coded input frame, and indications of the spatial partitioning schemes selected for them including an indication of the corresponding spatial offsets.

9. A video coder, comprising:
a decoded picture buffer (DPB),
a predictor for predicting from reference pictures in the DPB, and
a controller for executing instructions that cause:
determining a predetermined plurality of spatial partitioning schemes based on spatial offsets derived from temporal locations of corresponding input frames;
for each of a plurality of input frames of a video to be coded, selecting a spatial partitioning scheme from the predetermined plurality of spatial partitioning schemes, wherein partitions of the spatial partitioning schemes are spatially offset from partitions of others of the spatial partitioning schemes and the selecting is based on respective temporal locations of the input frames within the video,
for a first input frame:
partitioning the first input frame into partitioning units according to the spatial partitioning scheme selected for the first input frame;
coding the partitioning units of the first input frame according to a prediction algorithm including predicting the partitioning units of the first input frame by the predictor from reference picture(s) in the DPB;
for a second input frame temporally offset from the first input frame:
partitioning the second input frame into partitioning units according to the spatial partitioning scheme selected for the second input frame, and
coding the partitioning units of the second input frame according to a prediction algorithm including predicting the partitioning units of the second input frame by the predictor from reference picture(s) in the DPB; and
transmitting a coded video sequence including the first predictively-coded input frame, the second predictively-coded input frame, and indications of the spatial partitioning schemes selected for them including an indication of the corresponding spatial offsets.

10. A video decoding method, comprising:
extracting, from an encoded video sequence, an indication of spatial partitioning schemes for corresponding plurality of encoded frames, wherein partitions of the spatial partitioning schemes are spatially offset from partitions of others of the spatial partitioning schemes, and the indication of the spatial partitioning schemes includes an indication of spatial offsets derived from temporal locations of corresponding encoded frames,
for a first encoded frame:
partitioning the first encoded frame into partitioning units according to the spatial partitioning scheme indicated for the first encoded frame;
decoding the partitioning units of the first encoded frame according to a prediction algorithm; and
for a second encoded frame temporally offset from the first encoded frame:
partitioning the second encoded frame into partitioning units according to the spatial partitioning scheme indicated for the second encoded frame, and
decoding the partitioning units of the second encoded frame according to the prediction algorithm.

11. The method of claim 10, wherein
the spatial partitioning scheme indicated for the first encoded frame is spatial offset from an initial spatial partitioning scheme based on a temporal location of the first encoded frame, and
the spatial partitioning scheme indicated for the second encoded frame is spatial offset from the initial spatial partitioning scheme based on a temporal location of the second encoded frame.

12. The method of claim 10, wherein the spatial offsets are predetermined based on a selected offset function of time.

13. The method of claim 10, wherein the indication of the spatial offsets includes an indication of a selected offset function of time.

14. The method of claim 10, wherein the method further comprises:
prior to decoding the first or second encoded frames, determining the spatial partitioning schemes by deriving the spatial offsets from the function 2*modulo(t,N), where t is a respective temporal locations of an encoded frame, and N is a predetermined constant.

15. The method of claim 10, wherein the spatial offsets include a horizontal offset magnitude specified by a first selected function based on a first constant and a vertical offset magnitude specified by a second function based on a second constant.

16. The method of claim 10, wherein the plurality of spatial partitioning schemes includes irregular partitioning having partitions of varying shapes within a partitioning scheme for an encoded frame.

17. A non-transitory computer readable medium containing instructions for decoding video that, when executed by a processor, cause:
extracting, from an encoded video sequence, an indication of spatial partitioning schemes for corresponding plurality of encoded frames, wherein partitions of the spatial partitioning schemes are spatially offset from partitions of others of the spatial partitioning schemes, and the indication of the spatial partitioning schemes includes an indication of spatial offsets derived from temporal locations of corresponding encoded frames,
for a first encoded frame:
partitioning the first encoded frame into partitioning units according to the spatial partitioning scheme indicated for the first encoded frame;
decoding the partitioning units of the first encoded frame according to a prediction algorithm; and
for a second encoded frame temporally offset from the first encoded frame:
partitioning the second encoded frame into partitioning units according to the spatial partitioning scheme indicated for the second encoded frame, and
decoding the partitioning units of the second encoded frame according to the prediction algorithm.

18. A video decoder, comprising:
a decoded picture buffer (DPB),
a predictor for predicting from reference pictures in the DPB, and
a controller for executing instructions that cause:
extracting, from an encoded video sequence, an indication of spatial partitioning schemes for corresponding plurality of encoded frames, wherein partitions of the spatial partitioning schemes are spatially offset from partitions of others of the spatial partitioning schemes, and the indication of the spatial partitioning schemes includes an indication of spatial offsets derived from temporal locations of corresponding encoded frames,
for a first encoded frame:
partitioning the first encoded frame into partitioning units according to the spatial partitioning scheme indicated for the first encoded frame;
decoding the partitioning units of the first encoded frame according to a prediction algorithm; and
for a second encoded frame temporally offset from the first encoded frame:
partitioning the second encoded frame into partitioning units according to the spatial partitioning scheme indicated for the second encoded frame, and
decoding the partitioning units of the second encoded frame according to the prediction algorithm.

* * * * *